United States Patent
Atsumi et al.

(10) Patent No.: US 7,589,858 B2
(45) Date of Patent: Sep. 15, 2009

(54) IMAGE PROCESSING APPARATUS AND METHOD, IMAGE OUTPUT UNIT, AS WELL AS DIGITAL CAMERA AND PORTABLE TERMINAL USING THE IMAGE PROCESSING APPARATUS AND OUTPUT UNIT

(75) Inventors: Eiji Atsumi, Kamakura (JP); Kazunobu Shin, Katsushika-ku (JP)

(73) Assignee: Nokia Corporation, Espoo (FI)

( * ) Notice: Subject to any disclaimer, the term of this patent is extended or adjusted under 35 U.S.C. 154(b) by 687 days.

(21) Appl. No.: 11/011,931

(22) Filed: Dec. 14, 2004

(65) Prior Publication Data

US 2005/0219660 A1 Oct. 6, 2005

(51) Int. Cl.
*G06K 15/00* (2006.01)

(52) U.S. Cl. .................. 358/1.16; 358/518; 348/266

(58) Field of Classification Search ............. 358/1.16, 358/1.9, 2.1, 515, 518, 520; 382/162, 266; 348/272

See application file for complete search history.

(56) References Cited

U.S. PATENT DOCUMENTS

| | | | |
|---|---|---|---|
| 5,253,046 A * | 10/1993 | Shiraishi | 348/237 |
| 6,958,772 B1 * | 10/2005 | Sugimori | 348/222.1 |
| 2001/0033303 A1 | 10/2001 | Anderson | |
| 2003/0063205 A1 * | 4/2003 | Radl | 348/273 |

FOREIGN PATENT DOCUMENTS

| | | |
|---|---|---|
| CN | 88 200288 U | 12/1988 |
| JP | 11-18104 A | 1/1999 |
| JP | 2001-197346 | 7/2001 |
| WO | WO 99/18719 | 4/1999 |

* cited by examiner

*Primary Examiner*—James A Thompson
(74) *Attorney, Agent, or Firm*—Alston & Bird LLP (57) ABSTRACT

An image processing apparatus for processing pieces of color image data each including a plurality of sub-pieces of color image data pertaining to the plurality of color components respectively comprises: initial color image inputting means; data dividing means responsive to the initial color image data for dividing it in respect of color components and for providing pieces of mono-color image data each corresponding to one of the sub-pieces of color image data of the piece of initial color image data, the number of the pieces of mono-color image data being equal to or larger than the number of the color components; data processing means for effecting a predetermined processing on each piece of mono-color image data to provide secondary image data; and secondary image data outputting means. One or more pieces of mono-color image data, which belong to one of the plurality of color components, are included in the pieces of mono-color image data of the number equal to or larger than the number of the color components, and the total number of the data points of the pieces of mono-color image data is equal to the number of the data points of the piece of initial color image data.

26 Claims, 6 Drawing Sheets

IMAGE PROCESSING APPARATUS AND METHOD, IMAGE OUTPUT UNIT, AS WELL AS DIGITAL CAMERA AND PORTABLE TERMINAL USING THE IMAGE PROCESSING APPARATUS AND OUTPUT UNIT

TECHNICAL FIELD

The present invention relates to a processing apparatus for processing image data of pictures taken by digital cameras and the like, and more particularly to an image processing apparatus or image processing method enabling data to be processed or outputted while keeping image data small in size or quantity.

BACKGROUND ART

Usually a digital camera uses a single-plate type of CCD or CMOS sensor, which is an arrangement of lots of picture-taking elements or photodiodes. These picture-taking elements lack the color discriminating capability, and therefore, the sensor is used along with a color filter. There are two different color filters; one is of the type of using three primary colors (red, green and blue) and the other is of the type of using the complementary colors C, M and Y (abbreviated for cyan, magenta and yellow). The former is called "Primary Color Filter", and the latter is called "Complementary Color Filter". The typical primary color filter is a lattice arrangement of green elements with red and blue elements sandwiched therebetween to be in conformity with the Bayer primary color system. On the other hand the typical complementary color filter consists of an arrangement of cyan, magenta and yellow components, and additional green component, which human eyes are sensitive to. In taking color pictures with a digital camera a mosaic color filter is laid on its sensor, allowing each sensor element to detect a beam of light passing through the overlying color filter element, thus performing a required detection in respect of colors. Specifically each sensor element collects only one piece of primary color information, and the undetectable part of the color picture is interpolated, so that a final image may be provided.

Figure 6:
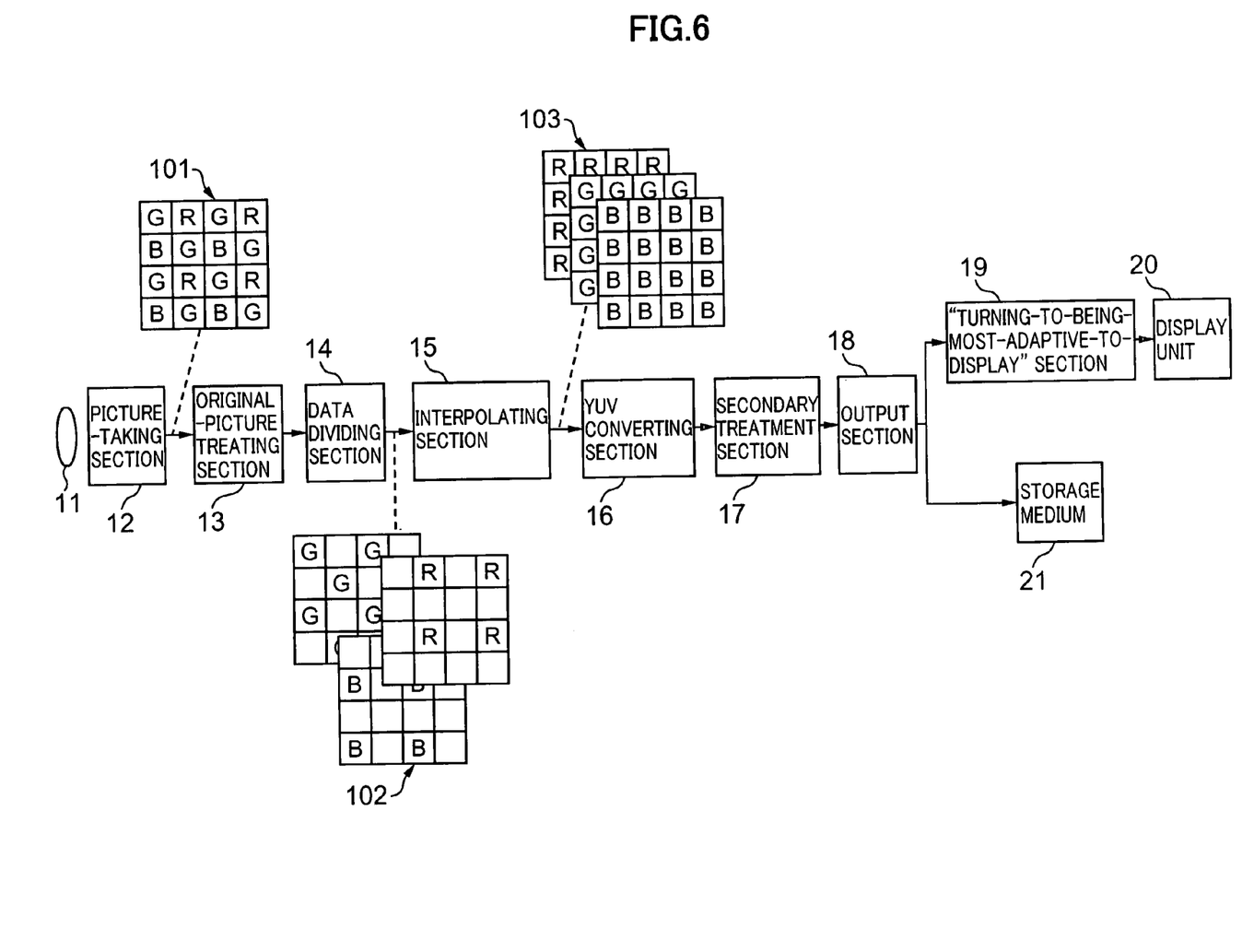
FIG. 6 shows a conventional image processing apparatus.

FIG. 6 shows the sequential image-processing steps, illustrating how the color image data from a digital camera, which is equipped with a CCD sensor and an associated color filter of the Bayer primary color system, is processed to obtain a final image.

The incident light is thrown onto the picture-taking section 12 via the lens 11. The light is converted into electric signal in the picture-taking section 12, and then is subjected to A/D conversion so that the digital data of the color image appears at the output terminals of the picture-taking section 12. Such digital data of color image is diagrammatically shown as a piece of color image data 101. As seen from the color pattern 101, the data structure comprises lots of red, blue and green constitutional components R, B and G recurrently arranged exactly in the same pattern as the primary Bayer system. In the original picture treating section this color image data 101 is subjected to the lens tone correction, white balance and any other treatments which are required for retouching the original picture. Then, in the data dividing section 14 the so treated image data is separated into three sub-pieces of color image data, each representing constitutional image pieces in respect of the three primary colors R, G and B. These sub-pieces of color image data are diagrammatically shown at 102. As seen from the color patterns 102 the red-representative image data is a representation of red elements distributed in the original picture 101, the sum of "R"-distribution squares being equal to one fourth or quarter (¼) of the whole sensor plane; the blue-representative image data is a representation of blue elements distributed in the original picture 110, the sum of "B"-distribution squares being equal to one fourth or quarter (¼) of the whole sensor plane; and the green-representative image data is a representation of green elements distributed in the original picture 110, the sum of "G"-distribution squares being equal to one half (½) of the whole sensor plane. Every data-absent or blank square is interpolated in the interpolating section 15. These sub-pieces of color image data provided at this step are diagrammatically shown at 103. It should be noted that the data points of each piece of mono-color image data 103 are equal to those of the picture-taking elements of the camera's sensor in number. These mono-color image data are subjected to YUV conversion in the YUV converting section 16, and then, to the secondary treatment such as contour highlight and gamma correction. The so treated data are outputted from the output section 18, and then subjected to the most-adaptability treatment in the "turning-to-being-most-adaptive-to-display" section 19. Finally the image data is displayed on the display unit 20 or stored in the storage medium 21.

Personal computers, cellular phones, PDAs (portable information terminals for individuals) and other information technology units have been developing these days, and some of those devices have cameras built therein. Under the circumstances it is required that the image data from the output unit 18 is not only stored or displayed but also sent via telephones, Bluetooth or any other wireless communication means to different receiving ends. For example, such output data of picture is attached to an e-mail.

As described above, the conventional image processing method causes the output data to increase three times as large as the original picture in quantities. As is well known, the cellular phone, PDA or any other portable information unit which is going to be redesigned to have a digital camera built in, is required to perform a variety of operations such as execution of some applications and communications, and accordingly it is necessary that the quantities of the data allotted for individual operation be reduced to minimum possible. Disadvantageously the conventional data processing method makes the output data amount increase three times as large as the data amount which is determined from the sensor's definition. In order to permit such a portable information device to accommodate the output data, therefore, it is unavoidable to lower the sensor's definition at the sending end. As for a signal bus between the portable information device and the digital camera it is necessary that its band width be expanded wide enough to accommodate the large quantities of output data. Such broad-band bus cannot be practically used because of the cost and space available in the device. As a matter of fact these make it difficult to build a digital camera in the portable information device.

Another problem is that: as long as the portable information device uses the conventional image processing method in handling the image data from the digital camera the image data cannot be processed at an increased efficiency. Generally speaking, the displays of portable information devices are small in size, and some of such displays can show only monochrome images. On the other hand the camera is much higher in definition than the display of the information device, and accordingly the information device wastes or discards some of the lot of image data in transforming into and showing images on the display of the information device. Incorporation of images into e-mails requires no images of high-definition. Therefore, it is demanded that the image data be so controlled in quantities that a relatively small amount of image data be used in the portable information device and that a relatively large amount of image data be used to provide high-definition images, for example for high-definition printing.

In view of the defects of the prior art as described above one object of the present invention is to provide an image processing apparatus or method capable of reducing a relatively large amount of output image data from a high-definition camera to a relatively small amount of output data as required.

In view of the defects of the prior art as described above another object of the present invention is to provide an image output unit capable of reducing a large amount of output image data in a high-definition camera to as small amount of output data as would be required by a portable information device.

In view of the defects of the prior art as described above still another object of the present invention is to provide a digital camera or portable information terminal device equipped with an image processing unit which is capable of curtailing the image data from the high-definition camera.

In view of the defects of the prior art as described above yet another object of the present invention is to provide a digital camera or portable information terminal device equipped with an image output unit which is capable of controlling the image data from the high-definition camera in quantities and providing the output image data of controlled amount to meet the need of the portable information device.

DISCLOSURE OF INVENTION

According to one aspect of the present invention an image processing apparatus for processing pieces of color image data each including a plurality of sub-pieces of color image data pertaining to the plurality of color components respectively comprises: initial color image inputting means for inputting an initial color image data to be processed; data dividing means responsive to the initial color image data for dividing it in respect of color components and for providing pieces of mono-color image data each corresponding to one of the sub-pieces of color image data of the piece of initial color image data, the number of the pieces of mono-color image data being equal to or larger than the number of the color components; data processing means for effecting a predetermined processing on each piece of mono-color image data to provide secondary image data; and secondary image data outputting means for providing the secondary image data, one or more pieces of mono-color image data, which belong to one of the plurality of color components, being included in the pieces of mono-color image data of the number equal to or larger than the number of the color components; and the total number of the data points of the pieces of mono-color image data being equal to the number of the data points of the piece of initial color image data while the number of the pieces of mono-color image data being equal to or larger than the number of the color components, The initial color image data is provided by taking a picture with a picture-taking unit comprising a CCD or MOS sensor and a color filter in combination, and by effecting the analogue-to-digital conversion on the signal from the picture-taking unit. Any other picture-taking unit appropriate for the purpose may be used. Preferably the number of the data points in the initial color image data (data-point number) is equal to the effective number of the pixels of the picture-taking unit (pixel number), but it does not matter whether the data-point number is more or less than the pixel number. The initial color image data may be subjected to some treatments for modifying the original picture, such as lens tone correction, deficient pixel correction and gamma correction.

According to one embodiment of the present invention the number of the data points of the secondary image data is equal to or less than the number of the data points of the initial color image data.

According to another embodiment of the present invention the secondary image data includes the color image data and/or the mono-color image data. Thus, any apparatus which is intended to get the secondary image data from the image processing apparatus according to the present invention can have the color image data and/or the mono-color image data, thus allowing a free choice. Assuming that a cellular phone is transmitting two-dimensional image data, the monochromic image data can be selected for transmission to the receiving end where only a small-sized data can be conveniently handled. Also, assuming that high-definition printing is required at the receiving end, both the color image data and the mono-color image data could be sent and used in forming and printing a high-definition color image. The data processing or data output device may be equipped with means responsive to instructions for selectively outputting either the color image data or the mono-color image data, or both According to yet another embodiment of the present invention the initial color image data includes color data pertaining to the color components of the RGB system, the color data being provided by a color-picture taking device equipped with a photo-detector of Bayer primary color component arrangement, comprising a spatial-recurrent arrangement of minute structures having first red-sensitive detection cells, second green-sensitive detection cells, third blue-sensitive detection cells and fourth green-sensitive detection cells all arranged in predetermined positions; and the data dividing means is adapted to separate the initial color image data into "R" data corresponding to the "R" component from the first detection cells, "G1" data corresponding to the "G" component from the second detection cells, "B" data corresponding to the "B" component from the third detection cells, and "G2" data corresponding to the "G" component from the fourth detection cells, thus providing a total of four pieces of mono-color image data.

According to still another embodiment of the present invention the initial color image data includes color data pertaining to the color components of the RGB system, the color data being provided by a color-picture taking device equipped with a photo-detector of Bayer primary color component arrangement, comprising a spatial-recurrent arrangement of minute structures having first red-sensitive detection cells, second green-sensitive detection cells, third blue-sensitive detection cells and fourth green-sensitive detection cells all arranged in predetermined positions; and the data dividing means is adapted to separate the initial color image data into "R" data corresponding to the "R" component from the first detection cells, "B" data corresponding to the "B" component from the third detection cells, "G1" data representing the low-frequency component of the "G" component from the fourth detection cells and "G2" data representing the high-frequency component of the "G" component from the fourth detection cells, thus providing a total of four pieces of mono-color image data.

According to still another embodiment of the present invention the data dividing means includes data converting means for effecting the low-pass filtering on "R" data and "B" data next to the said "R" data and "B" data respectively (for example, effecting local interpolation and low-pass filtering (specifically re-sampling) on "R" data and "B" data next to the said "R" data and "B" data respectively), and for effecting conversion on each "R" and "B" pixel in respect of pixel position and pixel value to determine the corresponding pixel position and value at the center each of the 2×2 minute structures of "R", "G1", "B" and "G2".

According to still another embodiment of the present invention the data processing means includes: data transforming means for effecting RGB-YUV conversion on the said "R" data, "G1" data and "B" data, thus providing Y1UV data consisting of Y1 data for Y component, "U" data for U component and "V" data for V component; and image data forming means for forming as the said secondary image data an image data including the Y1UV data and/or G2 data.

According to still another embodiment of the present invention the data processing means includes: data transforming means for effecting RGB-YUV conversion on the said "R" data, "G1" data and "B" data, thus providing 'Y1UV' data consisting of "Y1" data for "Y" component, "U" data for "U" component and "V" data for "V" component, and for effecting RGB-YUV conversion on the said "R" data, "G2" data and "B" data, thus providing "Y2" data for "Y" component; and image data forming means for forming as the said secondary image data an image data including the "Y1UV" data and/or "Y2" data.

According to still another embodiment of the present invention the data processing means further includes: data forming means for forming from the "Y1" and "Y2" data "Y" data which is a single "Y" component data; and image data forming means for forming the secondary image data as including any one or all of the "Y" data, "U" data and "V" data.

According to still another embodiment of the present invention the initial color image data is from a color-picture taking device using a complementary color filter. The complementary color is cyan, magenta and yellow relative to red, green and blue respectively, and sometimes green, which human eyes are very sensitive to, is added to these three complementary colors. Then, there are four complementary colors in total According to still another embodiment of the present invention the data processing means further includes data reducing means for reducing a selected part or parts of the "U" data and/or the "V" data. In one example of data reducing means the "U" data and/or the "V" data are sampled to reduce their data points in number. In another example of data reducing means the "G2" data bit depth is reduced from 8 bits per data point to 6 bits or 4 bits per data point. The output data size may be reduced by reducing the part which human eyes are less sensitive.

According to still another embodiment of the present invention the data processing means further includes data compressing means for effecting a predetermined data compression. A required data compression can be performed by the JPC or other well-known methods. The color image data and/or the mono-color image data may be compressed.

According to still another embodiment of the present invention an image processing apparatus further comprises: secondary image data inputting means for inputting the secondary image data; mono-color image data forming means responsive to the secondary image data from the secondary image data inputting means for forming three pieces of mono-color image data, that is, a piece of red image data consisting of only the red component, a piece of blue image data consisting of only the blue component, and a piece of green image data consisting of only the green component; interpolated mono-color image data forming means for effecting a predetermined interpolation on each of the three pieces of mono-color image data, and for forming three pieces of interpolated mono-color image data, of which the number of data points is equal to the number of data points of the piece of initial color image data; and interpolated mono-color image data outputting means for outputting the three pieces of interpolated mono-color image data. The three pieces of interpolated mono-color image data relative to red, blue and green make up together a single color image in the same way as in the prior art. As described above, each piece of interpolated mono-color image data has as many data points as the piece of initial color image data. Accordingly the data size increases, and the high-definition image data is outputted. Thus, the user may have two options: to output the small-sized secondary image data or to output the three pieces of interpolated mono-color image data for high-definition.

According to another aspect of the present invention a digital camera is equipped with an image processing apparatus as described above.

According to still another aspect of the present invention a portable information terminal is equipped with an image processing apparatus as described above.

According to still another aspect of the present invention an image output unit for outputting one or more pieces of image data from a piece of color image data including a plurality of sub-pieces of color image data pertaining to the plurality of color components respectively comprises: initial color image inputting means for inputting an initial color image data; data dividing means responsive to the initial color image data from the initial color image inputting means for dividing it in respect of color components and for providing pieces of mono-color image data each corresponding to one of the sub-pieces of color image data of the piece of initial color image data, the number of the pieces of mono-color image data being equal to or larger than the number of the color components; secondary image data forming means for forming from the pieces of mono-color image data a piece of secondary color image data and/or pieces of secondary mono-color image data; and outputting means for providing the piece of secondary color image data and/or the pieces of secondary mono-color image data, one or more pieces of mono-color image data, which belong to one of the plurality of color components, being included in the pieces of mono-color image data of the number equal to or larger than the number of the color components; and the total number of the data points of the pieces of mono-color image data being equal to the number of the data points of the piece of initial color image data while the number of the pieces of mono-color image data being equal to or larger than the number of the color components, According to one embodiment of the present invention the total number of the data points of the secondary image data and those of the secondary mono-color image data is equal to or less than the number of the data points of the initial color image data.

According to another embodiment of the present invention the initial color image data includes color data pertaining to the color components of the RGB system, the color data being provided by a color-picture taking device equipped with a photo-detector of Bayer primary color component arrangement, comprising a spatial-recurrent arrangement of minute structures having first red-sensitive detection cells, second green-sensitive detection cells, third blue-sensitive detection cells and fourth green-sensitive detection cells all arranged in predetermined positions; and the data dividing means is adapted to separate the initial color image data into "R" data corresponding to the "R" component from the first detection cells, "G1" data corresponding to the "G" component from the second detection cells, "B" data corresponding to the "B"

component from the third detection cells, and "G2" data corresponding to the "G" component from the fourth detection cells, thus providing a total of four pieces of mono-color image data; the secondary color image data including the "R" data, "G1" data and "B" data; and the secondary mono-color image data including the "G2" data.

According to still another embodiment of the present invention the secondary image data forming means includes: data transforming means for effecting RGB-YUV conversion on three pieces of mono-color image data selected from the four pieces of mono-color image data; and image data forming means for forming the secondary image data as including the post RGB-YUV conversion data.

According to still another aspect of the present invention an image processing method for processing pieces of color image data each including a plurality of sub-pieces of color image data pertaining to the plurality of color components respectively comprises the steps of: inputting an initial color image data to be processed; dividing the initial color image data in respect of color components and providing pieces of mono-color image data each corresponding to one of the sub-pieces of color image data of the piece of initial color image data, the number of the pieces of mono-color image data being equal to or larger than the number of the color components; effecting a predetermined processing on each piece of mono-color image data to provide secondary image data; and outputting the secondary image data, one or more pieces of mono-color image data, which belong to one of the plurality of color components, being included in the pieces of mono-color image data of the number equal to or larger than the number of the color components; and the total number of the data points of the pieces of mono-color image data being equal to the number of the data points of the piece of initial color image data while the number of the pieces of mono-color image data being equal to or larger than the number of the color components.

According to one embodiment of the present invention the number of the data points of the secondary image data is equal to or less than the number of the data points of the initial color image data.

According to another embodiment of the present invention the secondary image data includes the color image data and/or the mono-color image data.

According to still another embodiment of the present invention the initial color image data includes color data pertaining to the color components of the RGB system, the color data being provided by a color-picture taking device equipped with a photo-detector of Bayer primary color component arrangement, comprising a spatial-recurrent arrangement of minute structures having first red-sensitive detection cells, second green-sensitive detection cells, third blue-sensitive detection cells and fourth green-sensitive detection cells all arranged in predetermined positions; and at the data dividing step the initial color image data is divided into "R" data corresponding to the "R" component from the first detection cells, "G1" data corresponding to the "G" component from the second detection cells, "B" data corresponding to the "B" component from the third detection cells, and "G2" data corresponding to the "G" component from the fourth detection cells, thus providing a total of four pieces of mono-color image data.

According to still another embodiment of the present invention the initial color image data includes color data pertaining to the color components of the RGB system, the color data being provided by a color-picture taking device equipped with a photo-detector of Bayer primary color component arrangement, comprising a spatial-recurrent arrangement of minute structures having first red-sensitive detection cells, second green-sensitive detection cells, third blue-sensitive detection cells and fourth green-sensitive detection cells all arranged in predetermined positions; and at the data dividing step the initial color image data is divided into "R" data corresponding to the "R" component from the first detection cells, "B" data corresponding to the "B" component from the third detection cells, "G1" data representing the low-frequency component of the "G" component from the fourth detection cells and "G2" data representing the high-frequency component of the "G" component from the fourth detection cells, thus providing a total of four pieces of mono-image data.

According to still another embodiment of the present invention the image processing method further comprising the step of effecting RGB-YUV conversion on the said "R" data, "G1" data and "B" data and/or the step of effecting RGB-YUV conversion on the said "R" data, "G2" data and "B" data.

Some preferred embodiments of the present invention will be described below with reference to the accompanying drawings.

DESCRIPTION OF PREFERRED EMBODIMENTS

Figure 1:
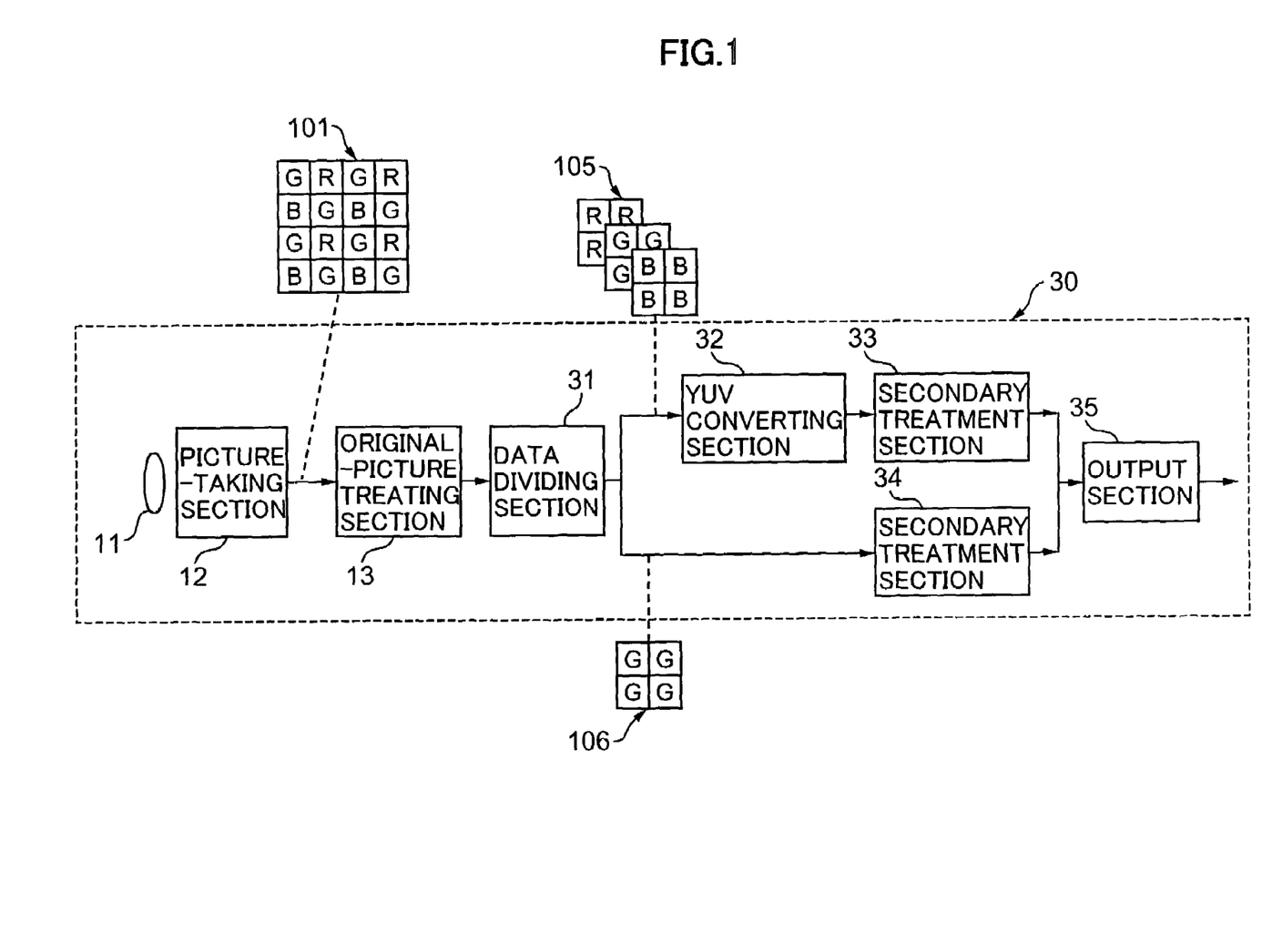
FIG. 1 shows a digital camera equipped with an image processing apparatus according to one embodiment of the present invention.

Referring to FIG. 1, a digital camera 30 is equipped with an image processing apparatus according to one embodiment of the present invention. In the digital camera 30 a beam of light reflected from a given object passes through the lens 11, and falls onto the picture-taking section 12, in which the beam of light is converted into digital color image data. In this particular embodiment the picture-taking section 12 comprises a photo-detector consisting of a single plate type of CCD sensor or CMOS sensor and an associated color filter, which includes a Bayer primary color component arrangement. The color image data from the picture-taking section 12 can be schematically shown at the reference numeral 101. It is a spatial-recurrent arrangement of minute structures representing red, blue and green components respectively, and arranged in so predetermined positions that the color image of the given object is provided. This color image data undergoes some original picture treatments such as lens tone correction, deficient pixel correction, white balancing and gamma correction. After such treatments the color image data structurally remains as shown at the reference numeral 101. The initial color image data thus treated is applied to the data dividing section 31.

Figure 2:
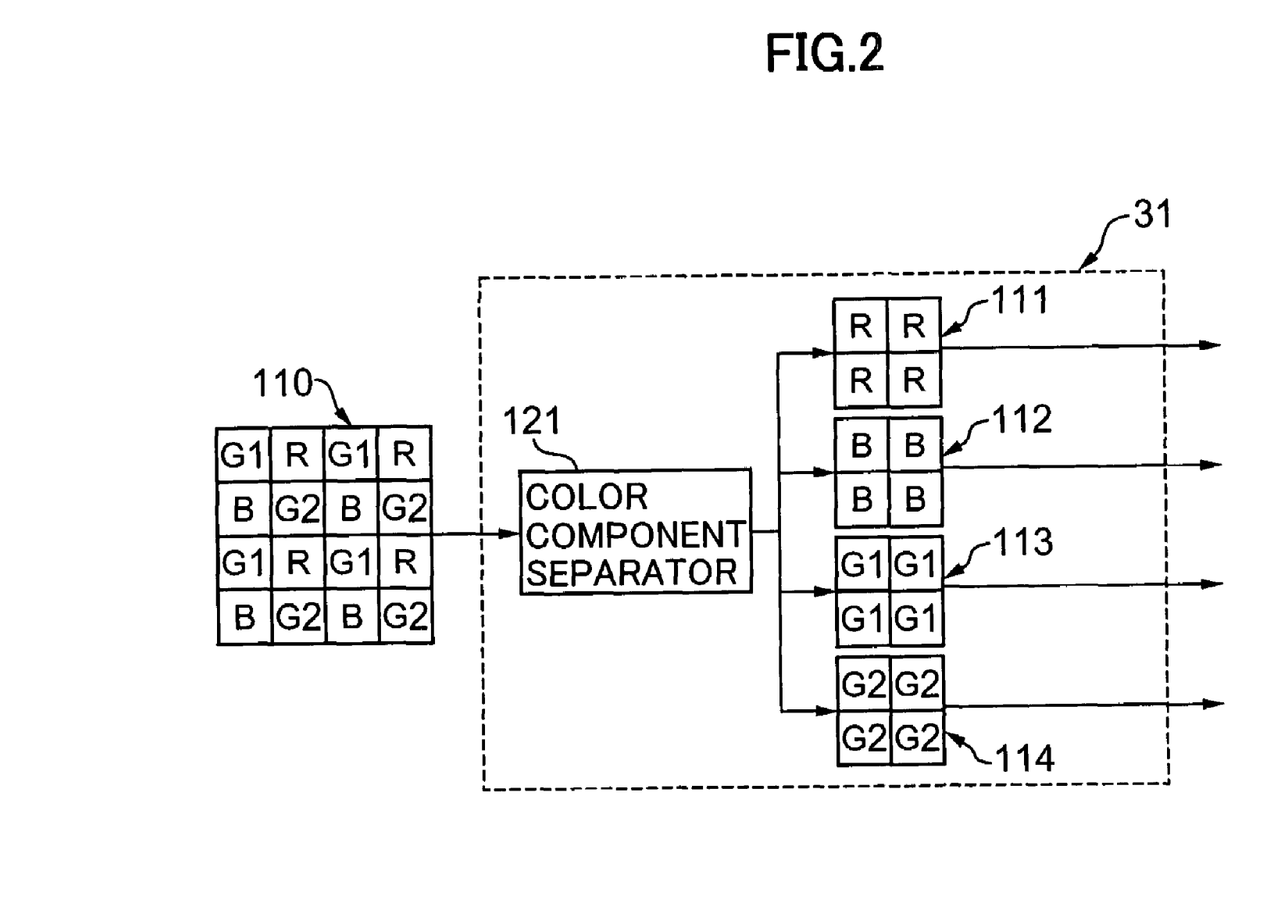
FIG. 2 shows schematically how a piece of color image data is divided into pieces of monochromic image data according to one embodiment of the present invention.

In the data dividing section 31 the initial color image data is separated in respect of color components. Consequently the sub-pieces of red, green and blue image data 105 and another sub-piece of green image data 106 are provided. Referring to FIG. 2, the manner in which these sub-pieces of mono-color image data can be provided is described below in detail.

The initial color image data 110 comprises a Bayer primary color component arrangement. Specifically the red component-representative data "R", the blue component-representative data "B", and the green component-representative data "G1" and "G2" are recurrently arranged. The data dividing section 31 has a color component separator 121 for separating the initial color image data 110 into four pieces of mono-color image data, that is, "R" image data 111, "B" image data 112, "G1" image data 113 and "G2" image data 114. The total number of the data points of these mono-color image data is equal to the number of the data points of the initial color image data. Also, each piece of mono-color image data has one and same number of data points.

The piece of "G1" image data 113 consists of green pixels "G1" each found next to each red pixel "R" on its left or right side in the initial color image data 101; and likewise, the piece of "G2" image data 114 consists of green pixels "G2" each found next to each blue pixel "B" on its left or right side in the initial color image data 101. As for the number of data points: the initial color image data 101 (see FIG. 1) has a total of sixteen pixels, that is, four "R" pixels, four "B" pixels, and eight "G" pixels. As seen from FIG. 1, each piece of mono-color image data 105 has four pixels (four "R", "G" or "B" pixels), and therefore, it has four data points. Likewise, another piece of mono-color image data 106 has four "G" pixels, and therefore, it has four data points. Only for the convenience of illustration FIG. 1 shows the initial color image data as having the least possible number of data points. As a matter of fact, the number of data points corresponds to that of the pixels of the photo-detector, specifically hundred thousands to million pixels. The data divider 31 may be equipped other functions, as for example are shown in FIG. 3.

Prior to division into the sub-pieces of mono-color image data "R", "B", "G1" and "G2" in the color component separator 121 the location of each "R" or "B" pixel is given in terms of the center position of each minute structure or cell, and then its pixel value is modified accordingly. Specifically "R" and "B" data are applied to an "N" input-and-one output filter 122 whose input characteristics so overlap adjacent cells to renew "R" and "B" pixel values. The positional relation between adjacent pixels and the positional deviation relative to the center of the cell are reflected in the filter coefficient. For one example, a weighted average filter capable of representing the inter-distance between adjacent pixels is appropriate for the purpose.

Figure 3:
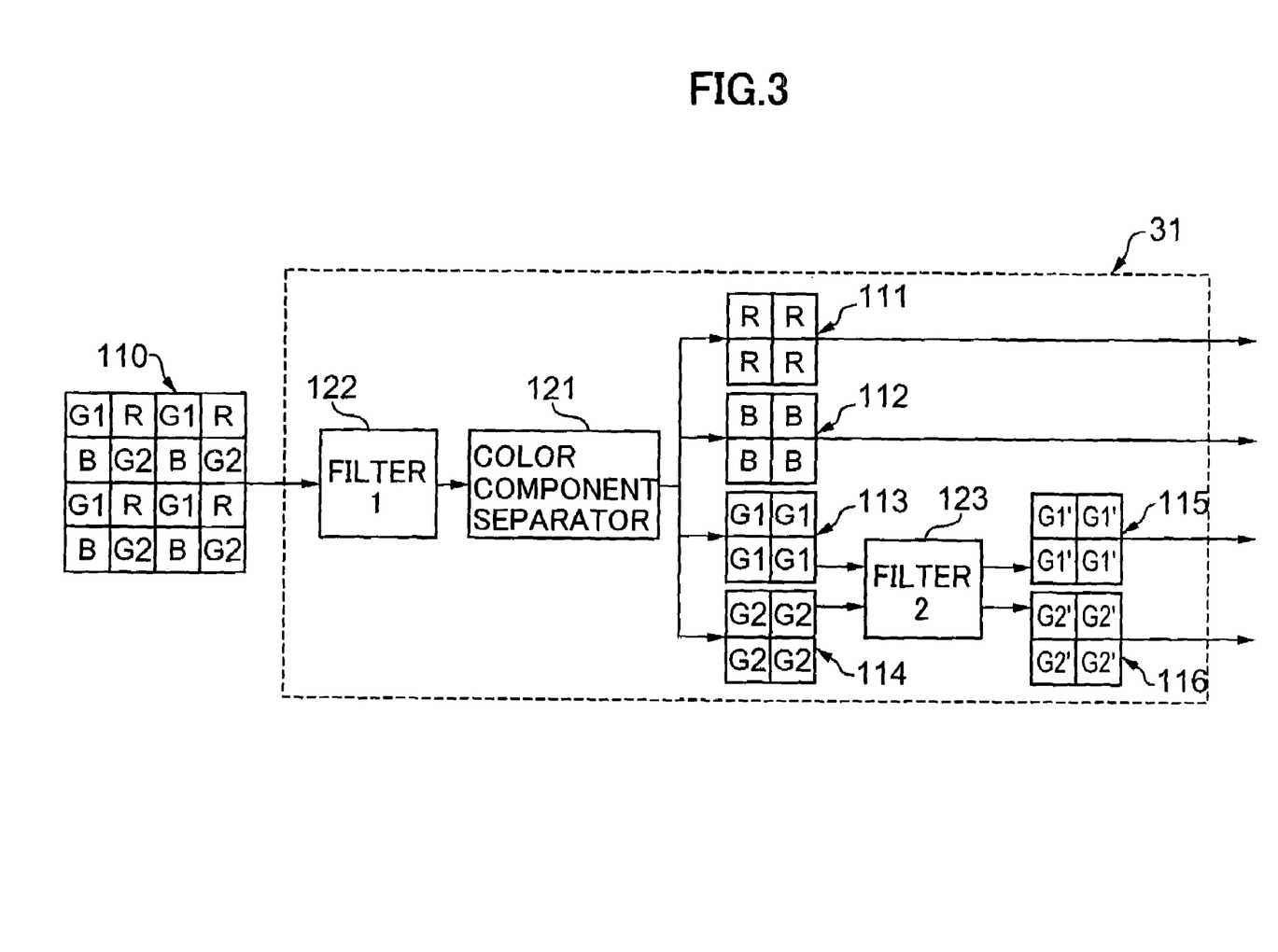
FIG. 3 shows schematically how a piece of color image data is divided into pieces of monochromic image data according to another embodiment of the present invention.

As for the sub-pieces of green image data 113 and 114 supplied by the color component separator 121 they can be regarded as two signal sources, which are connected to a two input-and-two output filter 123, thereby separating into the low-frequency component 115 (G1') both signals have in common, and the remaining high-frequency component 116 (G2'), as seen from FIG. 3. The required separation in respect of frequency can be attained by a multi-band filter, which consists of a low-pass filter and a high-pass filter.

Here, the low- and high-frequency separation of G1 and G2 is performed on each minute structure or cell, which contains one mono-color component. Alternatively a required filtering can be performed on adjacent pieces of G1 and G2 data in an overlapping fashion by using an (N+M) input-and-two output filter so that the common low-frequency components and the remaining high-frequency components may be determined not only on paired G1 and G2 but also on G1 and G2 adjacent to the paired G1 and G2. Thus, an efficient frequency-separation can be attained.

Referring to FIG. 1 again, out of the pieces of mono-color image data from the data dividing section 31 the pieces of G1, R and B image data 111, 112 and 113 are converted into YUV type of data in the YUV converting section 32, and then, the so converted data undergoes the secondary treatment such as contour emphasis and gamma correction in the secondary treatment section 33. The signal appearing at the output terminal of the secondary treatment section 33 may be fed back to the original picture treatment section 13 to be used there in the white balancing. The YUV data and/or "G2" data is outputted from the output section 35 as the secondary image data.

The image processing apparatus according to the present invention is similar to the conventional image processing apparatus of FIG. 6 in that the same amount of data is handled in the original picture treatment section. In the conventional image processor, however, data undergoes the interpolation in the interpolating section 15, and as a result the number of the data points to be treated in the YUV converting section 16 and the secondary treatment section 17 increases three times as large as the initial color image data. In contrast, in the image processor according to the present invention the number of the data points to be handled in the YUV converting section 32 and the secondary treatment section 33 decreases to three quarters (¾) of the number of the data points of the initial color image. As may be understood, the image processor according to the present invention practically reduces the data amount to be handled down to one quarter (¼) of the data amount as the conventional image processor would have to handle. The output data in the conventional image processor is three times as large as the initial image data in quantities whereas the output data in the image processor according to the present invention is equal to the initial image data, and one third of the output data in the conventional image processor. It should be noted that the reduction of the data amount treated and outputted can be attained without losing any piece of information contained in the original picture.

When further reduction of the output data is required, the secondary treatment sections 33 and 34 may be equipped with means for compressing the YUV data and/or G2 data according to the JPEG method or means for selectively discarding U and V component data from the YUV data. Otherwise, the secondary treatment section 34 may be equipped with means for reducing the bit data depth in the G2 data.

As is apparent from the above, the amount of the data appearing at the output terminal of the digital camera equipped with the image processing apparatus according to the present invention can be drastically reduced compared with the prior art digital camera. This provides a great advantage in a portable information terminal, such as a cellular phone equipped a digital camera. A digital camera cannot be built in a small-sized device such as a cellular phone without increasing the band width of the data bus between the digital camera and the cellular phone (see the data bus 51 in FIG. 4). Specifically the data bus must be increased in number so that an increased amount of data may be transferred. Any enlargement, however, must be limited to minimum possible to meet the recent tendency of down-sizing in the field of mobile devices.

Figure 4:
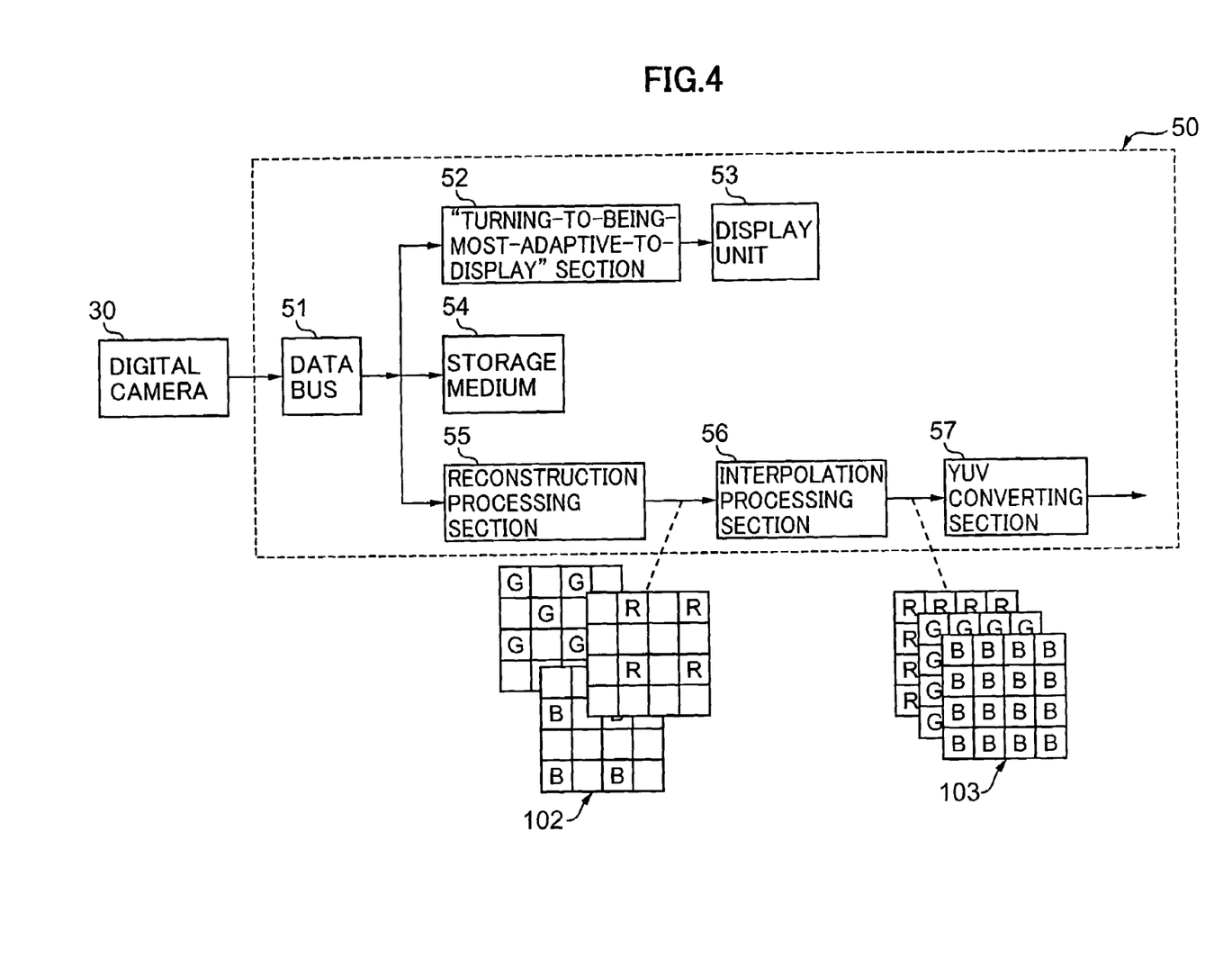
FIG. 4 shows schematically how the digital camera having an image processing apparatus equipped therewith according to the present invention can be connected to and used with a PDA.

In this particular embodiment the secondary image data outputted from the output section 35 contains three pieces of mono-color data equivalent to one half of the sensor definition and one piece of mono-color image data. Referring to FIG. 4, one example of using these pieces of information is described below. A digital camera 30 which is equipped with a picture processing unit according to the present invention is connected to a PDA 50 through the data bus 51. In case it is desired that a picture which is taken by the digital camera 30 is made to appear in the display section 53, the color image data contained in the secondary image data undergoes the adaptability treatment in the "turning-to-being-most-adaptive-to-display" section 52. The definition with which the picture can be reproduced from the color image data is one half of the definition of the sensor, but this causes no problem because the display area of the mobile information unit is small enough. In case the display of the PDA cannot show color pictures, or in case the picture is attached to an e-mail (in either case data reduction required), only the piece of mono-color image data is selected and used. The digital camera 30 may be designed to permit the output section 35 to selectively output one of the YUV data or G2 data to meet the occasional demand.

As may be understood from the above, the image processor according to the present invention can work efficiently to meet the characteristics of the particular device used in association with the image processor. Also, the image processor according to the present invention can be responsive to the color picture taken by a color picture-taking device for providing a given apparatus with the color picture and/or monochromatic image to meet the particular characteristics of the given apparatus.

In case the secondary image data is stored, the whole of the secondary image data is stored in the storage medium 54. In case the high-definition color-image reproduction is desired for example in printing, the reconstruction processing section 55 retrieves the secondary image data and turns into pieces of mono-color data 102, and then they undergo interpolations in the interpolation processing section 56, thus providing pieces of mono-color data 103 whose data quantities correspond to the definition of the sensor. In the YUV converting section 57 these high-precision pieces of mono-color data undergo some treatments as required for particular purposes. As may be understood, an information terminal with a digital camera built in according to the present invention usually process small quantities of data, but it can meet the occasional demand of processing large quantities of data.

Figure 5:
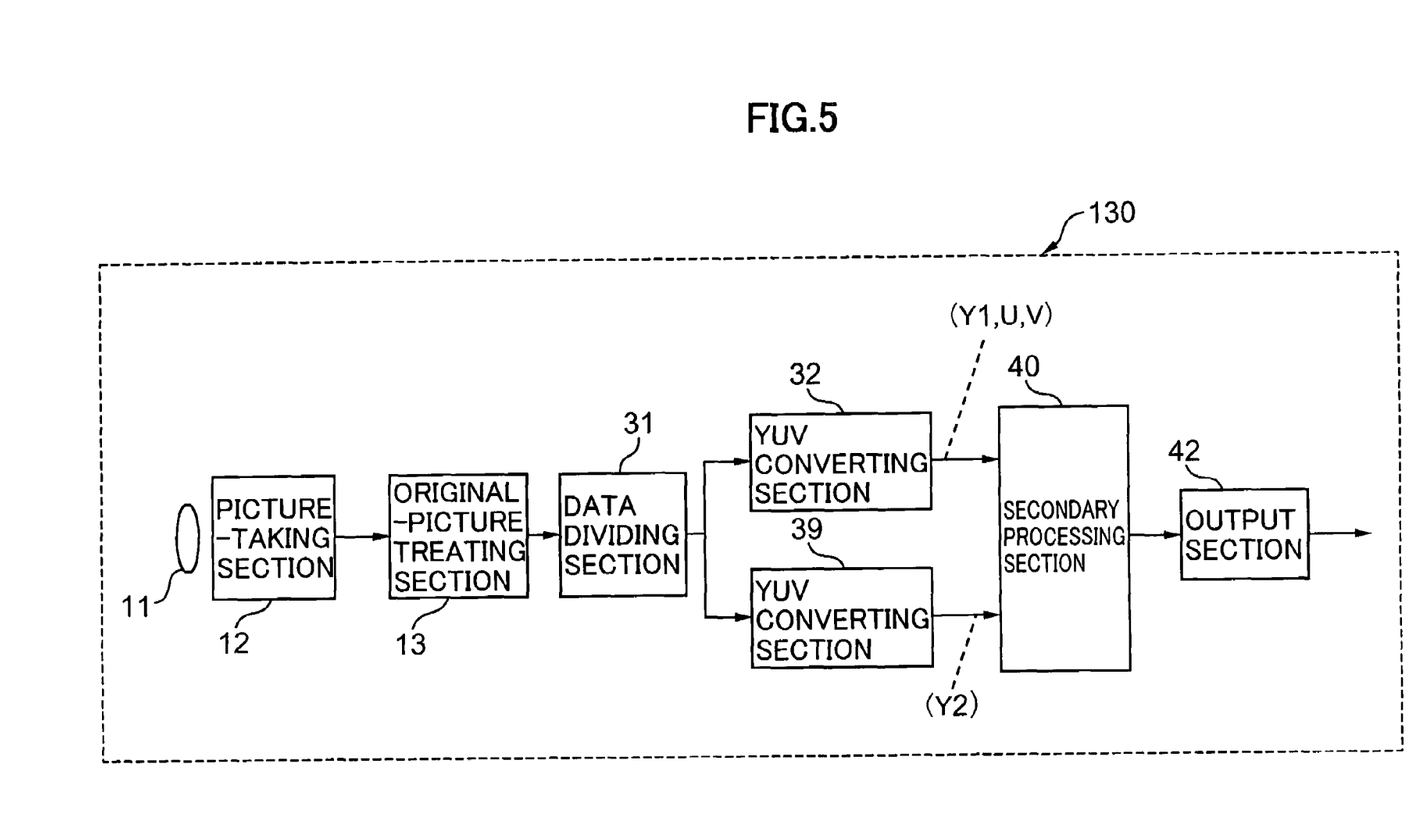
FIG. 5 shows a digital camera equipped with an image processing apparatus according to another embodiment of the present invention.

Referring to FIG. 5, a digital camera equipped with an image processor according to another embodiment of the present invention is described below.

In this digital camera 130 a beam of light reflected from a given object passes through the lens 11 to converge onto the picture-taking section 12 where the picture is transformed into a piece of color image data, which undergoes some required treatment in the original picture treating section 13. Then, the piece of color image data thus treated is directed to the data dividing section 31 where it is separated into four pieces of red image data (R), blue image data (B), green image data (G1) and another green image data (G2). The digital camera 130 works so far in the same way as the digital camera 30 of FIG. 1. Then, the digital camera 130 works as follows: the pieces of mono-color image data R, G1 and B are converted into the Y1UV data, that is, pieces of Y component data (Y1), U component data (U) and V component data (V) in the YUV converting section 39, and at the same time, the pieces of mono-color image data R, G2 and B are converted into another piece of Y component data (Y2) in the YUV converting section 39. The Y1UV data undergoes some secondary treatment such as contour emphasis and gamma correction. Finally the Y1UV data and the Y2 data are outputted from the output section 42. The secondary processing section 40 may have some additional functions of: reducing some of the U and V data; forming from the Y1 and Y2 data a single piece of Y data whose data amount is twice as large as that of the Y1 and Y2 data in terms of definition; and effecting JPEG-compression on some or all of the data supplied to the output section 40.

For the convenience of understanding the embodiments of the present invention above described are shown and described as being consisted of indispensable structural elements. The present invention, therefore, should not be limited in scope to these embodiments, which can be modified as for instance follows:

In separating the initial color image data into some pieces of mono-color data in the above described embodiments the piece of green data is divided into two sub-pieces of green data, but any other piece of mono-color data may be divided into two sub-pieces. For example, in handling an initial color image data whose arrangement is different from the Bayer primary color component arrangement, the piece of image data including the color data pertaining to the red component in the picture may be divided into two sub-pieces of mono-color data. Also, it may be possible that the piece of image data including the color data pertaining to the blue component in the picture may be divided into two sub-pieces of mono-color data. In this case out of the pieces of color image data pertaining to the color components in an initial color image data the one having the most numerous pixels may be selected for division. Assuming that the pixels in the piece of green data are larger than those in the piece of blue data in number, the piece of green data would be divided. In case the color filter is a complementary color filter, four pieces of cyan, magenta, yellow and green data are included in the piece of initial image data, and it is, therefore, divided into these four pieces of color data.

As seen from the above, the present invention permits reduction of the processing data amount in a given picture and of the outputting data amount without losing any piece of information in the original picture.

Also, the present invention permits any given device to be supplied with an appropriate amount of data to meet the characteristics of the given device, thus assuring the efficient use of data.

The invention claimed is:

1. An apparatus comprising:
    initial color image inputting means for inputting an initial color image data to be processed;
    data dividing means responsive to the initial color image data for dividing the initial color image data into pieces of mono-color image data, a number of the pieces of mono-color image data being equal to or larger than a number of the color components;
    data processing means for effecting a predetermined processing on at least some of the pieces of mono-color image data to provide secondary image data, the predetermining processing including converting the at least some of the pieces of mono-color image data to YUV component data without increasing a number of processed data points via interpolation; and
    secondary image data outputting means for outputting the secondary image data.

2. An apparatus according to claim 1 wherein the secondary image data includes the initial color image data and/or the mono-color image data.

3. An apparatus according to claim 1 wherein the initial color image data includes color data pertaining to the color components of the RGB system, the color data being provided by a color-picture taking device equipped with a photo-detector of Bayer primary color component arrangement, comprising a spatial-recurrent arrangement of minute structures having first red-sensitive detection cells, second green-sensitive detection cells, third blue-sensitive detection cells and fourth green-sensitive detection cells all arranged in predetermined positions; and wherein the data dividing means is configured to separate the initial color image data into "R" data corresponding to the "R" component from the first detection cells, "G1" data corresponding to the "G" component from the second detection cells, "B" data corresponding to the "B" component from the third detection cells, and "G2" data corresponding to the "G" component from the fourth detection cells, thus providing a total of four pieces of mono-color image data.

4. An apparatus according to claim 3 wherein the data dividing means includes data converting means for effecting the low-pass filtering on "R" data and "B" data next to the said "R" data and "B" data respectively, and for effecting conversion on each "R" and "B" pixel in respect of pixel position and pixel value to determine the corresponding pixel position and value at the center each of the 2.times.2 minute structures of "R", "G1", "B" and "G2".

5. An apparatus according to claim 3 wherein the data processing means includes:
   data transforming means for effecting RGB-YUV conversion on the said "R" data, "G1" data and "B" data, thus providing Y1UV data consisting of Y1 data for Y component, "U" data for U component and "V" data for V component; and
   image data forming means for forming as the said secondary image data an image data including the Y1UV data and/or G2 data.

6. An apparatus according to claim 3 wherein the data processing means includes:
   data transforming means for effecting RGB-YUV conversion on the said "R" data, "G1" data and "B" data, thus providing "Y1UV" data consisting of "Y1" data for "Y" component, "U" data for "U" component and "V" data for "V" component, and for effecting RGB-YUV conversion on the said "R" data, "G2" data and "B" data, thus providing "Y2" data for "Y" component; and
   image data forming means for forming as the said secondary image data an image data including the "Y1UV" data and/or "Y2" data.

7. An apparatus according to claim 6 wherein the data processing means further includes:
   data forming means for forming from the "Y1" and "Y2" data "Y" data which is a single "Y" component data; and
   image data forming means for forming the secondary image data as including any one or all of the "Y" data, "U" data and "V" data.

8. An apparatus according to claim 6 wherein the data processing means further includes data reducing means for reducing a selected part or parts of the "U" data and/or the "V" data.

9. An apparatus according to claim 3 wherein the apparatus further comprises:
   secondary image data inputting means for inputting the secondary image data;
   mono-color image data forming means responsive to the secondary image data from the secondary image data inputting means for forming three pieces of mono-color image data, that is, a piece of red image data consisting of only the red component, a piece of blue image data consisting of only the blue component, and a piece of green image data consisting of only the green component;
   interpolated mono-color image data forming means for effecting a predetermined interpolation on each of the three pieces of mono-color image data, and for forming three pieces of interpolated mono-color image data, of which the number of data points is equal to the number of data points of the piece of initial color image data; and
   interpolated mono-color image data outputting means for outputting the three pieces of interpolated mono-color image data.

10. An apparatus according to claim 1 wherein the initial color image data includes color data pertaining to the color components of the RGB system, the color data being provided by a color-picture taking device equipped with a photo-detector of Bayer primary color component arrangement, comprising a spatial-recurrent arrangement of minute structures having first red-sensitive detection cells, second green-sensitive detection cells, third blue-sensitive detection cells and fourth green-sensitive detection cells all arranged in predetermined positions; and wherein the data dividing means is configured to separate the initial color image data into "R" data corresponding to the "R" component from the first detection cells, "B" data corresponding to the "B" component from the third detection cells, "G1" data representing the low-frequency component of the "G" component from the fourth detection cells and "G2" data representing the high-frequency component of the "G" component from the fourth detection cells, thus providing a total of four pieces of mono-color image data.

11. An apparatus according to claim 1 wherein the initial color image data is from a color-picture taking device using a complementary color filter.

12. An apparatus according claim 1 wherein the data processing means further includes data compressing means for effecting a predetermined data compression.

13. An apparatus according to claim 1 wherein the apparatus comprises a digital camera.

14. An apparatus according to claim 1 wherein the apparatus comprises a portable information terminal.

15. An apparatus according to claim 1 wherein none of the initial color image inputting means, the data dividing means, the data processing means, or the secondary image data outputting means performs an interpolation on the initial color image data or the pieces of mono-color image data.

16. An apparatus comprising:
   initial color image inputting means for inputting an initial color image data;
   data dividing means responsive to the initial color image data from the initial color image inputting means for dividing the initial color image data into pieces of mono-color image data, a number of the pieces of mono-color image data being equal to or larger than a number of the color components;
   data transforming means for effecting RGB-YUV conversion on at least some of the pieces of mono-color image data without increasing a number of processed data points via interpolation;
   secondary image data forming means for forming from the pieces of mono-color image data a piece of secondary color image data and/or pieces of secondary mono-color image data; and
   outputting means for outputting the piece of secondary color image data and/or the pieces of secondary mono-color image data.

17. An apparatus according to claim 16 wherein the initial color image data includes color data pertaining to the color components of the RGB system, the color data being provided by a color-picture taking device equipped with a photodetector of Bayer primary color component arrangement, comprising a spatial-recurrent arrangement of minute structures having first red-sensitive detection cells, second green-sensitive detection cells, third blue-sensitive detection cells and fourth green-sensitive detection cells all arranged in predetermined positions; and wherein the data dividing means is configured to separate the initial color image data into "R" data corresponding to the "R" component from the first detection cells, "G 1" data corresponding to the "G" component from the second detection cells, "B" data corresponding to the "B" component from the third detection cells, and "G2" data corresponding to the "G" component from the fourth detection cells, thus providing a total of four pieces of mono-color image data; the secondary color image data including the "R" data, "G 1" data and "B" data; and the secondary mono-color image data including the "G2" data.

18. An apparatus according to claim 17 wherein the secondary image data forming means includes
  image data forming means for forming the secondary image data as including the post RGB-YUV conversion data; and
  wherein the data transforming means for effecting the RGB-YUV conversion includes means for effecting the RGB-YUV conversion on three pieces of mono-color image data selected from the four pieces of mono-color image data.

19. An apparatus according to claim 16 wherein none of the initial color image inputting means, the data dividing means, the secondary image data forming means, or the outputting means performs an interpolation on the initial color image data or the pieces of mono-color image data.

20. A method comprising:
  inputting an initial color image data to be processed;
  dividing the initial color image data in respect of color components into pieces of mono-color image data, a number of the pieces of mono-color image data being equal to or larger than a number of the color components;
  effecting a predetermined processing on at least some of the pieces of mono-color image data to provide secondary image data, the predetermined processing including converting the at least some of the pieces of mono-color image data to YUV component data without increasing a number of processed data points via interpolation; and
  outputting the secondary image data.

21. The method according to claim 20 wherein the secondary image data includes the initial color image data and/or the mono-color image data.

22. The method according to claim 20 wherein the initial color image data includes color data pertaining to the color components of the RGB system, the color data being provided by a color-picture taking device equipped with a photodetector of Bayer primary color component arrangement, comprising a spatial-recurrent arrangement of minute structures having first red-sensitive detection cells, second green-sensitive detection cells, third blue-sensitive detection cells and fourth green-sensitive detection cells all arranged in predetermined positions; and wherein dividing the initial color image data includes the initial color image data being divided into "R" data corresponding to the "R" component from the first detection cells, "G1" data corresponding to the "G" component from the second detection cells, "B" data corresponding to the "B" component from the third detection cells, and "G2" data corresponding to the "G" component from the fourth detection cells, thus providing a total of four pieces of mono-color image data.

23. The method according to claim 22 wherein the initial color image data includes color data pertaining to the color components of the RGB system, the color data being provided by a color-picture taking device equipped with a photodetector of Bayer primary color component arrangement, comprising a spatial-recurrent arrangement of minute structures having first red-sensitive detection cells, second green-sensitive detection cells, third blue-sensitive detection cells and fourth green-sensitive detection cells all arranged in predetermined positions; and at the data dividing step the initial color image data is divided into "R" data corresponding to the "R" component from the first detection cells, "B" data corresponding to the "B" component from the third detection cells, "G1" data representing the low-frequency component of the "G" component from the fourth detection cells and "G2" data representing the high-frequency component of the "G" component from the fourth detection cells, thus providing a total of four pieces of mono-image data.

24. The method according to claim 22 or 23 wherein converting the least some of the pieces of mono-color image data further comprises effecting RGB-YUV conversion on the "R" data, "G1" data and "B" data and/or effecting RGB-YUV conversion on the "R" data, "G2" data and "B" data.

25. A method according to claim 20 wherein none of inputting, dividing, effecting, or outputting includes interpolating the initial color image data or the pieces of mono-color image data.

26. An apparatus comprising:
  a data divider configured to divide initial color image data in respect of color components into pieces of mono-color image data;
  a processor configured to effect a predetermined processing on at least some of the pieces of mono-color image data to provide secondary image data, the predetermined processing including converting the at least some of the pieces of mono-color image data to YUV component data without increasing a number of processed data points via interpolation; and
  the processor being further configured to provide for outputting the secondary image data.

* * * * *

UNITED STATES PATENT AND TRADEMARK OFFICE
CERTIFICATE OF CORRECTION

PATENT NO. : 7,589,858 B2                          Page 1 of 1
APPLICATION NO. : 11/011931
DATED : September 15, 2009
INVENTOR(S) : Atsumi et al.

It is certified that error appears in the above-identified patent and that said Letters Patent is hereby corrected as shown below:

On the title page:

Insert the following:

--(30) Foreign Application Priority Data

June 18, 2002 (JP) .................2002-177107--;

--(62) Related U.S. Application Data

Continuation of PCT/JP03/07742, filed June 18, 2003--.

Signed and Sealed this

Second Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,589,858 B2 Page 1 of 1
APPLICATION NO. : 11/011931
DATED : September 15, 2009
INVENTOR(S) : Atsumi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1171 days.

Signed and Sealed this

Twenty-first Day of September, 2010

David J. Kappos
*Director of the United States Patent and Trademark Office*